(12) United States Patent
Murakami et al.

(10) Patent No.: US 11,478,871 B2
(45) Date of Patent: Oct. 25, 2022

(54) WELDING APPARATUS AND WELDING METHOD

(71) Applicant: KABUSHIKI KAISHA YASKAWA DENKI, Kitakyushu (JP)

(72) Inventors: Masafumi Murakami, Fukuoka (JP); Fuminori Inagaki, Fukuoka (JP)

(*) Notice: Subject to any disclaimer, the term of this patent is extended or adjusted under 35 U.S.C. 154(b) by 297 days.

(21) Appl. No.: 16/583,278

(22) Filed: Sep. 26, 2019

(65) Prior Publication Data

US 2020/0101551 A1   Apr. 2, 2020

(30) Foreign Application Priority Data

Sep. 28, 2018   (JP) .............................. JP2018-183603

(51) Int. Cl.
*B23K 9/095* (2006.01)
*B23K 9/09* (2006.01)
(Continued)

(52) U.S. Cl.
CPC ............ *B23K 9/0953* (2013.01); *B23K 9/091* (2013.01); *B23K 9/1012* (2013.01);
(Continued)

(58) Field of Classification Search
CPC .... B23K 9/0953; B23K 9/091; B23K 9/1012; B23K 9/1062; B23K 9/1093; G05B 19/182; G05B 2219/45135
See application file for complete search history.

(56) References Cited

U.S. PATENT DOCUMENTS 5,495,091 A   2/1996  Tabata et al.
6,051,810 A   4/2000  Stava
(Continued)

FOREIGN PATENT DOCUMENTS

CN   101585108   11/2009
DE   102006050297   4/2008
(Continued)

OTHER PUBLICATIONS

Extended Search Report in corresponding European Application No. 19200019.8, dated Feb. 19, 2020.
(Continued)

*Primary Examiner* — Brian W Jennison
(74) *Attorney, Agent, or Firm* — Soei Patent & Law Firm

(57) ABSTRACT

An example welding apparatus includes a welding power source configured to output current between a consumable electrode and a workpiece; a feeding apparatus configured to move the consumable electrode toward the workpiece; and circuitry. The circuitry is configured to: control the welding power source to repeat a sequence including: outputting a positive peak current from the workpiece to the consumable electrode during a positive peak period; outputting a first base current between the consumable electrode and the workpiece during a first base period following the positive peak period, an absolute value of the first base current being less than the positive peak current; and outputting a negative peak current from the consumable electrode to the workpiece during a negative peak period following the first base period, an absolute value of the negative peak current being greater than the absolute value of the first base current. The circuitry is further configured to control the feeding apparatus to move the consumable electrode close to the workpiece so as to temporarily short circuit the consumable electrode and the workpiece during the first base period.

20 Claims, 12 Drawing Sheets

(51) Int. Cl.
*B23K 9/10* (2006.01)
*B23K 9/12* (2006.01)
*G05B 19/18* (2006.01)

(52) U.S. Cl.
CPC .......... *B23K 9/1062* (2013.01); *B23K 9/1093* (2013.01); *B23K 9/126* (2013.01); *G05B 19/182* (2013.01); *G05B 2219/45135* (2013.01)

(56) References Cited

U.S. PATENT DOCUMENTS

| | | | |
|---|---|---|---|
| 7,842,903 | B2 | 11/2010 | Myers |
| 2002/0030043 | A1* | 3/2002 | Tong ................ B23K 9/125 219/137 PS |
| 2005/0051525 | A1 | 3/2005 | Yamada et al. |
| 2007/0056944 | A1 | 3/2007 | Artelsmair |
| 2007/0102408 | A1 | 5/2007 | Peters |
| 2008/0156781 | A1 | 7/2008 | Artelsmair et al. |
| 2008/0223829 | A1 | 9/2008 | Wilhelm |
| 2010/0155383 | A1 | 6/2010 | Shiozaki et al. |
| 2012/0074115 | A1 | 3/2012 | Kazmaier et al. |
| 2013/0112675 | A1 | 5/2013 | Peters |
| 2014/0021182 | A1 | 1/2014 | Peters et al. |
| 2014/0076858 | A1 | 3/2014 | Peters |
| 2014/0083987 | A1 | 3/2014 | Dodge et al. |
| 2014/0263237 | A1 | 9/2014 | Daniel et al. |
| 2018/0214969 | A1 | 8/2018 | Fleming et al. |
| 2020/0055135 | A1 | 2/2020 | Takada et al. |

FOREIGN PATENT DOCUMENTS

| | | |
|---|---|---|
| EP | 1658919 | 5/2006 |
| EP | 1958724 | 8/2008 |
| EP | 2202024 | 6/2010 |
| JP | S63-157765 | 6/1988 |
| JP | H6-063747 | 3/1994 |
| JP | 2008-531283 | 8/2008 |
| JP | 2009-285701 | 12/2009 |
| JP | 2010-075983 | 4/2010 |
| JP | 2010-234441 | 10/2010 |
| JP | 2012-096276 | 5/2012 |
| JP | 2015-530252 | 10/2015 |
| JP | 3203250 | 3/2016 |
| JP | 2018-118317 | 8/2018 |
| JP | 6372447 | 8/2018 |
| WO | 2006/089322 | 8/2006 |
| WO | 2014/045111 | 3/2014 |
| WO | 2014/140733 | 9/2014 |

OTHER PUBLICATIONS

Extended Search Report in corresponding European Application No. 19200047.9, dated Feb. 26, 2020.
SOEI Patent and Law Firm, Statement of Related Matters, dated Dec. 5, 2019.
Office Action issued in European Patent Application No. 19200019.8 dated May 7, 2021.
Office Action issued in U.S. Appl. No. 16/583,279, dated Nov. 1, 2021.
Office Action issued in Japanese Patent Application No. P2018-183589, dated Mar. 8, 2022 (with English partial translation).
Office Action issued in Japanese Patent Application No. P2018-183603, dated Mar. 1, 2022 (with English partial translation).
Office Action issued in Chinese Patent Application No. 201910911827.0 dated Dec. 3, 2021 (with English partial translation).
Office Action issued in Chinese Patent Application No. 201910911976.7 dated Dec. 2, 2021 (with English partial translation).
Defu He, "Introduction to Welding and Joining Engineering", Shanghai Municipal Commission of Education, Dec. 1998.
Office Action issued in Chinese Patent Application No. 201910911827.0 dated Jun. 7, 2022.
Tong Hongiun, Ueyama Tomoyuki et al., "Control Method of Arc Stabilization in AC/DC Pulsed MIG Welding", Dec. 12, 2005, vol. 23, P53-P64.

* cited by examiner

WELDING APPARATUS AND WELDING METHOD

CROSS-REFERENCE TO RELATED APPLICATION

This application is based upon and claims the benefit of priority from Japanese Patent Application No. 2018-183603, filed on Sep. 28, 2018, the entire contents of which are incorporated herein by reference.

BACKGROUND

Field

The present disclosure relates to a welding apparatus and a welding method.

Description of the Related Art

Japanese Unexamined Patent Publication No. 2009-285701 discloses an AC pulse arc welding apparatus that alternately applies a positive polarity current and a reverse polarity current between a consumable electrode and a welding target. This apparatus includes a controlling means for executing a first step of outputting a pulse current in reverse polarity, then executing a second step of outputting a base current in reverse polarity to generate a short circuit, then executing a third step of outputting a pulse current in positive polarity, and then executing a fourth step of outputting a base current in positive polarity.

SUMMARY

An example welding apparatus disclosed herein may include a welding power source configured to output current between a consumable electrode and a workpiece; a feeding apparatus configured to move the consumable electrode toward the workpiece; and circuitry. The circuitry may be configured to: control the welding power source to repeat a sequence including: outputting a positive peak current from the workpiece to the consumable electrode during a positive peak period; outputting a first base current between the consumable electrode and the workpiece during a first base period following the positive peak period, an absolute value of the first base current being less than the positive peak current; and outputting a negative peak current from the consumable electrode to the workpiece during a negative peak period following the first base period, an absolute value of the negative peak current being greater than the absolute value of the first base current. The circuitry may be further configured to control the feeding apparatus to move the consumable electrode close to the workpiece so as to temporarily short circuit the consumable electrode and the workpiece during the first base period.

An example welding method is also disclosed herein. The welding method may include generating, from a welding power source, an alternating pattern of a positive peak current and a negative peak current between a consumable electrode and a workpiece; and moving the consumable electrode toward the workpiece by a feeding apparatus. Additionally, the welding method may further include controlling the welding power source to generate a first sequence of the alternating pattern including the positive peak current that is output from the workpiece to the consumable electrode during a positive peak period, a first base current that is output between the workpiece and the consumable electrode during a first base period following the positive peak period, and the negative peak current that is output from the consumable electrode to the workpiece during a negative peak period following the first base period. Additionally, the welding method may further include controlling the feeding apparatus to move the consumable electrode close to the workpiece so as to temporarily short circuit the consumable electrode and the workpiece during the first base period.

DETAILED DESCRIPTION

Figure 1:
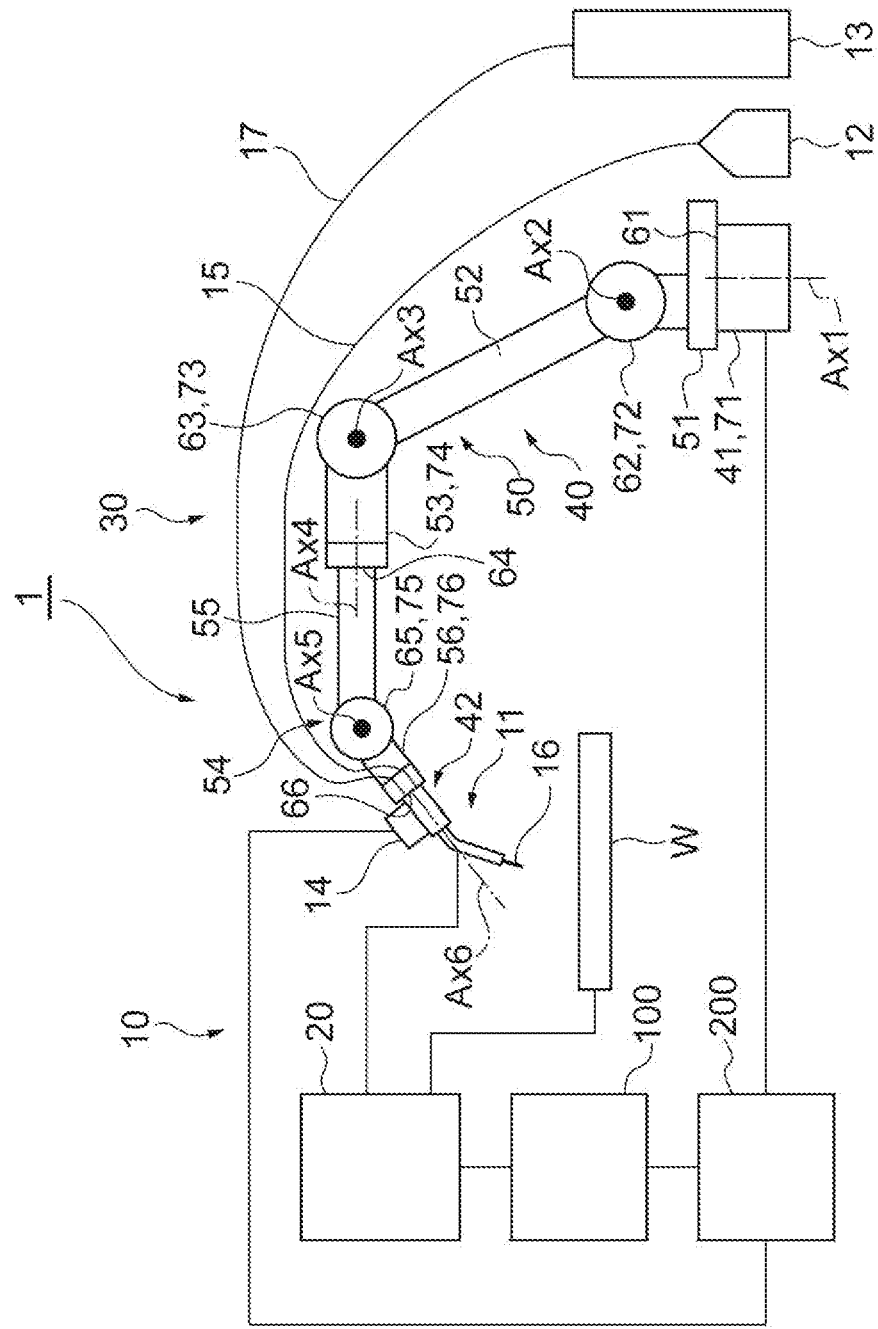
FIG. 1 is a schematic diagram illustrating an example configuration of a welding system.

Hereinafter, with reference to the drawings, the same elements or similar elements having the same function are denoted by the same reference numerals, and redundant description is omitted.

Welding System

An example welding system 1 illustrated in FIG. 1 is a system for automatically executing at least part of arc welding work of a welding target (hereinafter referred to as "workpiece W"). The welding system 1 includes a welding apparatus 10 and a robot system 30.

The robot system 30 includes a robot 40 and a robot controller 200 that controls the robot 40. The robot 40 arranges a welding tool (for example, a welding torch 11) at a welding target position. For example, the robot 40 is a six-axis vertical articulated robot, and has a base 41, a tool holder 42, and an articulated arm 50. The base 41 is installed, for example, on a floor surface in a work area of the robot 40. Note that the base 41 may be installed in a movable part, such as a cart.

The articulated arm 50 connects the base 41 and the tool holder 42, and changes a position and an attitude of the tool holder 42 with respect to the base 41. The articulated arm 50 is, for example, a serial link type, and includes a pivoting portion 51, a first arm 52, a second arm 53, a wrist portion 54, and actuators 71, 72, 73, 74, 75, and 76.

The pivoting portion 51 is provided on an upper portion of the base 41 so as to be pivotable about a vertical axis Ax1.

In some examples, the articulated arm 50 has a joint 61 which enables the pivoting portion 51 to pivot about the axis Ax1. The first arm 52 is connected to the base 41 so as to be swingable about an axis Ax2 that intersects (for example, is orthogonal to) the axis Ax1. For example, the articulated arm 50 may have a joint 62 which enables the first arm 52 to swing about the axis Ax2. Note that the term "intersect" as used here also includes a case where axes may be in a twisted relationship with each other, as in what is called solid crossing. The second arm 53 is connected to an end of the first arm 52 so as to be swingable about an axis Ax3 intersecting the axis Ax1. In some examples, the articulated arm 50 has a joint 63 which enables the second arm 53 to swing about the axis Ax3. The axis Ax3 may be parallel to the axis Ax2.

The wrist portion 54 has a pivoting arm 55 and a swinging arm 56. The pivoting arm 55 extends from an end of the second arm 53 along the center of the second arm 53 and is pivotable about an axis Ax4 along the center of the second arm 53. In some examples, the articulated arm 50 has a joint 64 that enables the pivoting arm 55 to pivot about the axis Ax4. The swinging arm 56 is connected to an end of the pivoting arm 55 so as to be swingable about an axis Ax5 that intersects (for example, is orthogonal to) the axis Ax4. For example, the articulated atm 50 may have a joint 65 which enables the swinging arm 56 to swing about the axis Ax5.

The tool holder 42 is connected to an end of the swinging arm 56 so as to be pivotable about an axis Ax6 along the center of the swinging arm 56. In some examples, the articulated arm 50 has a joint 66 which enables the tool holder 42 to pivot about the axis Ax6.

The actuators 71, 72, 73, 74, 75, and 76 use, for example, an electric motor as a power source, and drive a plurality of the joints 61, 62, 63, 64, 65, and 66 of the articulated arm 50, respectively. For example, the actuator 71 causes the pivoting portion 51 to pivot around the axis Ax1, the actuator 72 causes the first arm 52 to swing around the axis Ax2, the actuator 73 causes the second arm 53 to swing around the axis Ax3, the actuator 74 causes the pivoting arm 55 to pivot around the axis Ax4, the actuator 75 causes the swinging arm 56 to swing around the axis Ax5, and the actuator 76 causes the tool holder 42 to pivot around the axis Ax6.

The configuration of the robot 40 described above is merely an example. The robot 40 may have other configurations in which a position and an attitude of the tool holder 42 with respect to the base 41 are changed by the articulated atm 50. For example, the robot 40 may be a seven-axis robot obtained by adding a redundant axis to the six-axis vertical articulated robot.

The welding apparatus 10 is an apparatus that supplies a consumable electrode to a welding point and supplies power for welding between the consumable electrode and the workpiece W. The consumable electrode is an electrode which is melted and consumed as a welding material. For example, the welding apparatus 10 includes the welding torch 11, a pail pack 12, a gas cylinder 13, a feeding apparatus 14, a welding power source 20, and a welding controller 100 that controls the welding power source 20. Although the welding controller 100 may be separate from the welding power source 20 in FIG. 1, in other examples the welding controller 100 may be incorporated in the welding power source 20.

The welding torch 11 is held by the tool holder 42 as described above, and guides a consumable electrode (for example, a welding wire 16) to a welding point. Pail pack 12 supplies the welding wire 16 to the welding torch 11. For example, the pail pack 12 accommodates the coiled welding wire 16 and is connected to the welding torch 11 via the conduit cable 15.

The gas cylinder 13 supplies shielding gas to the welding torch 11. The shielding gas may be, for example, carbon dioxide, argon or mixed gas of these. For example, the gas cylinder 13 is connected to the welding torch 11 via a gas hose 17.

The feeding apparatus 14 sends the welding wire 16 supplied to the welding torch 11 to the workpiece W side. For example, the feeding apparatus 14 is provided on the welding torch 11 and performs forward feeding and reverse feeding of the welding wire 16 using an actuator, such as a servomotor, as a power source. The forward feeding means advancing the welding wire 16 so that a tip of the welding wire 16 approaches the workpiece W. The reverse feeding means retracting the welding wire 16 so that the tip of the welding wire 16 moves away from the workpiece W.

Figure 2:
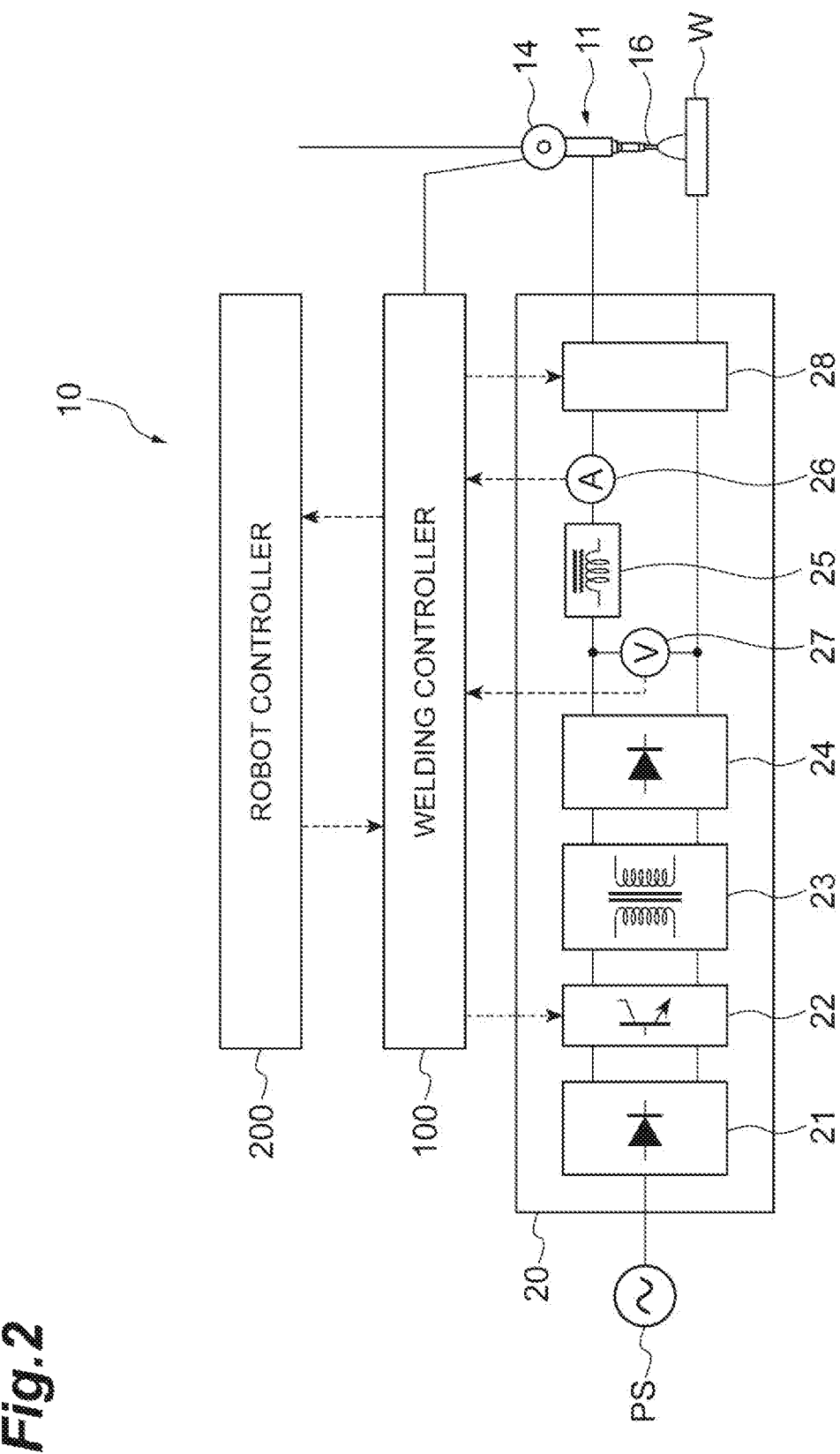
FIG. 2 is a schematic diagram illustrating an example configuration of a welding apparatus.

The welding power source 20 outputs current between the welding wire 16 and the workpiece W. As illustrated in FIG. 2, for example, the welding power source 20 includes a primary rectifier circuit 21, an inverter circuit 22, a transformer 23, a secondary rectifier circuit 24, a polarity switching unit 28, a reactor 25, and a current sensor 26, and a voltage sensor 27.

The primary rectifier circuit 21 converts AC power of a commercial power source PS into DC. The inverter circuit 22 converts DC power converted into DC by the primary rectifier circuit 21 into AC power of an amplitude and a frequency according to a control command. The transformer 23 changes a voltage and a current on the primary side while insulating the primary side (the inverter circuit 22 side) and the secondary side, and outputs power to the secondary side. The secondary rectifier circuit 24 converts AC power on the secondary side of the transformer 23 into DC, and outputs the power between the welding wire 16 and the workpiece W. The polarity switching unit 28 switches the polarity of the power output from the secondary rectifier circuit 24. In some examples, the polarity switching unit 28 switches between a positive output by which the workpiece W becomes positive and a negative output by which the workpiece W becomes negative. The reactor 25 smoothes the output power from the secondary rectifier circuit 24 (for example, the output power from the secondary rectifier circuit 24 to the polarity switching unit 28). The current sensor 26 detects output current from the secondary rectifier circuit 24. The voltage sensor 27 detects output voltage from the secondary rectifier circuit 24. The polarity switching unit 28 may be built in the welding power source 20. In other examples, the polarity switching unit 28 may be configured as a unit separate from the welding power source 20, and may be interposed between the welding power source 20 and the welding wire 16 and the workpiece W.

Welding Controller

The welding controller 100 controls the feeding apparatus 14 and the welding power source 20 to supply the welding wire 16 and power output to the welding wire 16 (power output between the welding wire 16 and the workpiece W) in accordance with a preset welding condition. For example, the welding controller 100 is configured to execute control of the welding power source 20 to alternately repeat a positive electrode peak period (or a positive peak period) for outputting a peak current with the workpiece W as a positive electrode and a negative electrode peak period (or a negative peak period) for outputting a peak current with the workpiece W as a negative electrode. A base period for outputting a base current is interposed between the positive electrode peak period and the negative electrode peak period. Additionally, the welding controller may be configured to cause the feeding apparatus 14 to bring (or move) the welding wire 16 close to the workpiece W so as to temporarily short circuit the welding wire 16 and the workpiece W at least during the base period (for example, a first base period following the positive peak period) after the positive electrode peak period. In some examples, the welding controller 100 may be configured to control the welding power source 20 to repeat a sequence including: outputting a positive peak current from the workpiece to the welding wire 16 during a positive peak period; outputting a first base current between the welding wire 16 and the workpiece W during a first base period following the positive peak period, an absolute value of the first base current being less than the positive peak current; and outputting a negative peak current from the welding wire 16 to the workpiece W during a negative peak period following the first base period, an absolute value of the negative peak current being greater than the absolute value of the first base current.

The peak current is set to, for example, a magnitude that promotes melting of the welding wire 16 by heat generation. The base current is set to be smaller than the peak current, and is set, for example, to maintain an arc between the welding wire 16 and the workpiece W while not promoting the melting of the welding wire 16. The welding controller 100 may be configured to cause the feeding apparatus 14 to bring the welding wire 16 close to the workpiece W so as to temporarily short circuit the welding wire 16 and the workpiece W even during the base period after the negative electrode peak period. In some examples, the welding controller 100 may be configured to control the welding power source 20 to repeat the sequence further including outputting a second base current between the welding wire 16 and the workpiece W during the second base period following the negative peak period, an absolute value of the second base current being less than an absolute value of the negative peak current. The welding controller 100 may be configured to control the feeding apparatus 14 to move the welding wire 16 close to the workpiece so as to temporarily short circuit the welding wire 16 and the workpiece W during the second base period.

Figure 3:
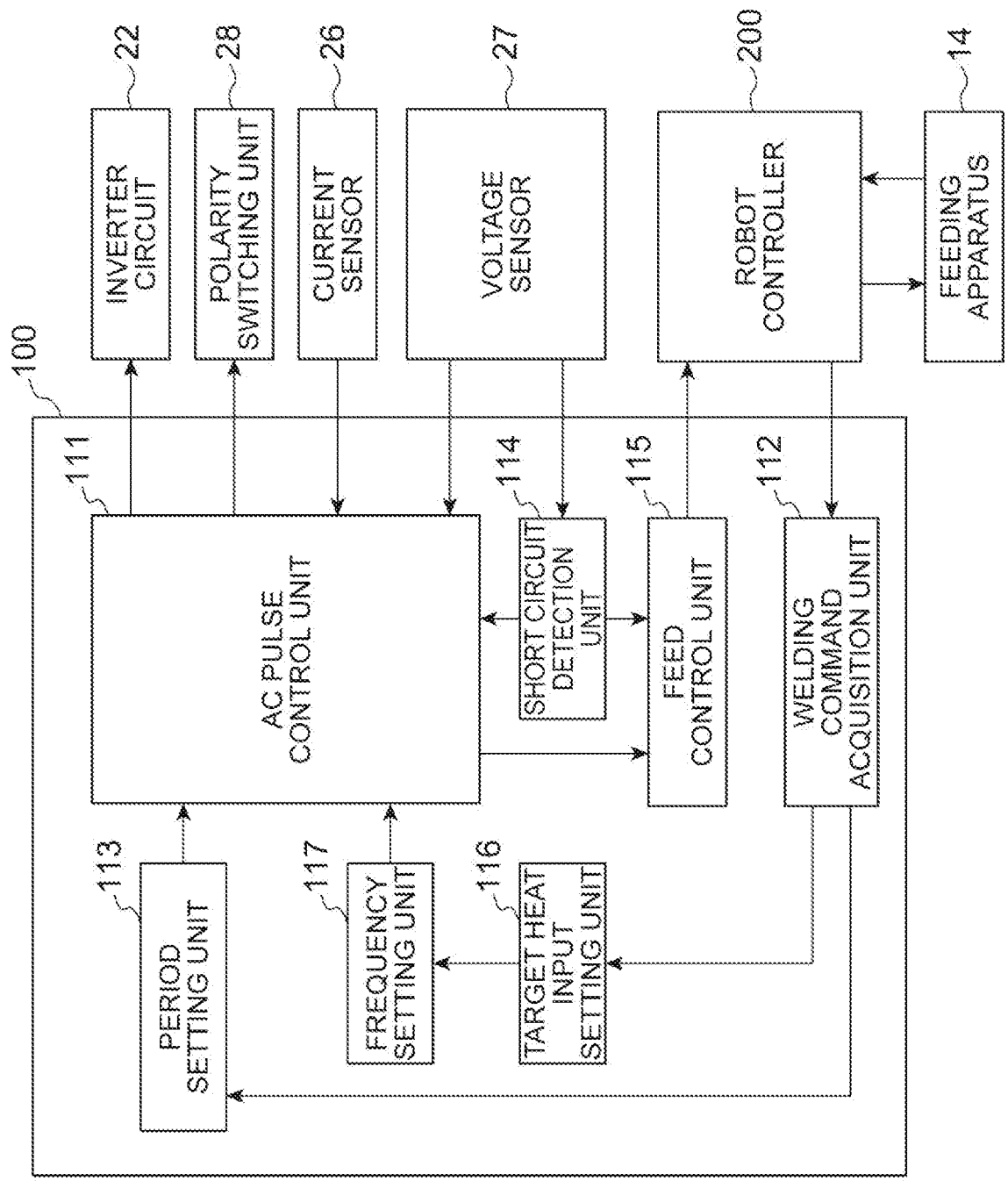
FIG. 3 is a block diagram illustrating an example functional configuration of a welding controller.

As illustrated in FIG. 3, for example, the welding controller 100 has an AC pulse control unit 111, a welding command acquisition unit 112, a period setting unit 113, and a short circuit detection unit 114, and a feed control unit 115 as functional configurations (hereinafter referred to as "functional modules").

Figure 4:
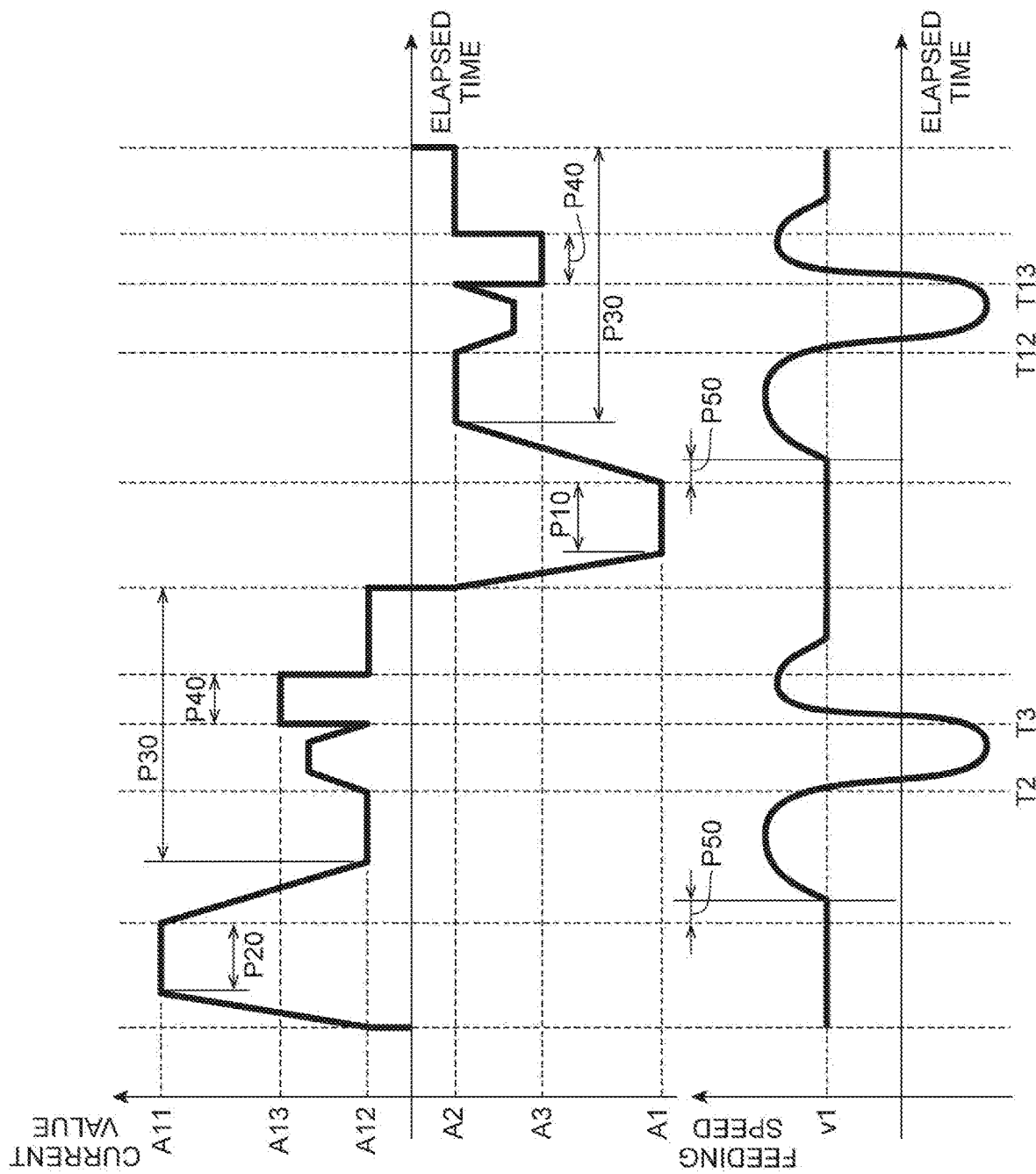
FIGS. 4A and 4B are a graph illustrating an example transition of current and a feeding speed.

The AC pulse control unit 111 controls the welding power source 20 as to alternately repeat the positive electrode peak period and the negative electrode peak period with the base period interposed therebetween. FIG. 4A is a graph which illustrates an example transition of current output by the welding power source 20 according to control of the AC pulse control unit 111. A horizontal axis of this graph shows elapsed time. A vertical axis of this graph indicates a current value, where a direction from the welding wire 16 toward the workpiece W side is positive. Therefore, in this graph, a positive electrode peak period P10 is illustrated on the negative side, and a negative electrode peak period P20 is illustrated on the positive side.

As illustrated in FIG. 4A, the AC pulse control unit 111 controls the welding power source 20 so as to alternately repeat the positive electrode peak period P10 in which a peak current A1 is output with the workpiece W as a positive electrode and the negative electrode peak period P20 in which a peak current A11 is output with the workpiece W as a negative electrode with the base period P30 interposed. In some examples, the AC pulse control unit 111 controls the inverter circuit 22 so as to cause a current value (for example, a current value detected by the current sensor 26) to follow a pattern in which the positive electrode peak period P10 and the negative electrode peak period P20 are alternately repeated with the base period P30 interposed therebetween. As an example, the AC pulse control unit 111 controls the welding power source 20 so as to output a base current A2 with the workpiece W as the positive electrode during the base period P30 after the positive electrode peak period P10, and output a base current A12 with the workpiece W as the negative electrode during the base period P30 after the negative electrode peak period P20.

The welding command acquisition unit 112 acquires a welding command from another controller (for example, the robot controller 200). The welding command acquisition unit 112 may acquire a welding command based on the user's input to an operation panel or the like, instead of acquiring the command from robot controller 200. The welding command includes welding start and end commands and welding conditions. The welding conditions include at least one of a target bead width, a target penetration depth, a workpiece thickness, a target current, a target voltage, and a target feeding speed of the welding wire 16. The target current is, for example, a target for an average value of the magnitudes of current. The target voltage is, for example, a target for an average value of the magnitudes of voltages.

The period setting unit 113 sets at least a length of the base period P30 based on the target current. For example, the period setting unit 113 sets a length of the base period P30 such that an average value of the magnitudes of current output from the welding power source 20 matches the target current. The period setting unit 113 may change a length of the base period P30 by fixing lengths of the positive electrode peak period P10 and the negative electrode peak period P20, or may change both lengths of the positive electrode peak period P10 and the negative electrode peak period P20, and length of the base period P30.

The short circuit detection unit 114 detects start and release of a short circuit between the welding wire 16 and the workpiece W. The short circuit may be understood to include a state in which the welding wire 16 and the workpiece W are electrically connected via a molten material of the welding wire 16. When transitioning from the arc state to the short circuit state, an absolute value of a potential difference between the welding wire 16 and the workpiece W rapidly decreases. On the other hand, when transitioning from the short circuit state to the arc state, an absolute value of the potential difference between the welding wire 16 and the workpiece W rapidly increases. Utilizing this property, the short circuit detection unit 114 detects start and release of the short circuit based on, for example, a voltage detection value (hereinafter, simply referred to as "voltage detection value") by the voltage sensor 27.

For example, the short circuit detection unit 114 detects the start of a short circuit when an absolute value of the voltage detection value falls below a predetermined threshold. The short circuit detection unit 114 may detect the start of a short circuit when a decrease rate of the absolute value of the voltage detection value exceeds a predetermined threshold. The short circuit detection unit 114 detects the release of the short circuit when the absolute value of the voltage detection value exceeds a predetermined threshold. The short circuit detection unit 114 may detect the release of the short circuit when an increase rate of the absolute value of the voltage detection value exceeds a predetermined threshold.

The feed control unit 115 controls the feeding apparatus 14 to feed the welding wire 16 to the workpiece W in accordance with a preset target feeding speed. As described above, the welding wire 16 which is a consumable electrode is melted and consumed as a welding material. The target feeding speed is set to keep a distance between a tip of the welding wire 16 to be consumed and the workpiece W within a predetermined range. The predetermined range is preset, for example, to maintain an arc state between the welding wire 16 and the workpiece W.

Control of the feeding apparatus 14 includes a driver circuit for driving an actuator of the feeding apparatus 14. A driver circuit for an external axis of the robot controller 200 (a driver circuit for an actuator other than the actuators 71, 72, 73, 74, 75, and 76 of the robot 40) can be used as the driver circuit. In some examples, the feed control unit 115 controls the feeding apparatus 14 via the robot controller 200.

The feed control unit 115 causes the feeding apparatus 14 to bring the welding wire 16 close to the workpiece W so as to temporarily short circuit the welding wire 16 and the workpiece W during the base period after the positive electrode peak period and the base period after the negative electrode peak period. For example, the feed control unit 115 temporarily sets the feeding speed (feeding speed to the workpiece W side) of the welding wire 16 by the feeding apparatus 14 to be higher than the target feeding speed to bring the welding wire 16 close to the workpiece W.

FIG. 4B is a graph illustrating transition of the feeding speed of the welding wire 16 by the feeding apparatus 14. A horizontal axis of this graph shows elapsed time. A vertical axis of this graph shows the feeding speed, where a direction of sending from the welding wire 16 to the workpiece W side is positive. As illustrated in FIG. 4B, when a standby period P50 elapses by using the completion of the peak period (the positive electrode peak period P10 or the negative electrode peak period P20) as reference, the feed control unit 115 sets the feeding speed of the welding wire 16 by the feeding apparatus 14 to be larger than a target feeding speed v1 to start approach of the welding wire 16 to the workpiece W. In some examples, the reference time of the elapsed time is limited to the completion of the peak period. However, in other examples, the feed control unit 115 may set the start time of the base period as the reference time for the elapsed time.

When the welding wire 16 approaches the workpiece W to a certain extent, the melted portion at the tip of welding wire 16 comes into contact with the workpiece W and a short circuit is started, and an absolute value of the current output from the welding power source 20 rises (see times T2 and T12 in FIGS. 4A and 4B). The start of the short circuit is detected by the short circuit detection unit 114 as described above. The feed control unit 115 sets the feeding speed of the welding wire 16 by the feeding apparatus 14 to be smaller than the target feeding speed v1 in response to the detection of the start of a short circuit by the short circuit detection unit 114, and starts detachment of the welding wire 16 from the workpiece W.

When the welding wire 16 is separated from the workpiece W to a certain extent, the tip of the welding wire 16 is separated from the workpiece W and the short circuit is released, and the absolute value of the current output from the welding power source 20 decreases (see times T3 and T13 in FIG. 4A). The release of a short circuit is also detected by the short circuit detection unit 114. The feed control unit 115 sets the feeding speed of the welding wire 16 by the feeding apparatus 14 to be larger than the target feeding speed v1 in response to the detection of the release of a short circuit by the short circuit detection unit 114, and returns the feeding speed of the welding wire 16 to the target feeding speed v1 after the welding wire 16 is brought close to the workpiece W again.

In some examples, the feed control unit 115 may start the detachment of the welding wire 16 from the workpiece W in response to the detection of the start of a short circuit by the short circuit detection unit 114. However, in other examples the feed control unit 115 may start the detachment of the welding wire 16 from the workpiece W according to the elapsed time from the completion of the peak period, the start of the base period, or the like. Further, whereas the feed control unit 115 may start the re-approaching of the welding wire 16 to the workpiece W in accordance with the detection of the release of a short circuit by the short circuit detection unit 114. In other examples, the feed control unit 115 may start re-approaching of the welding wire 16 to the workpiece W according to the elapsed time from the completion of the peak period, the start of the base period, or the like.

The AC pulse control unit 111 may adjust the absolute value of the current output from the welding power source 20 in response to the start and release of a short circuit. For example, the AC pulse control unit 111 controls the welding power source 20 so as to suppress an increase in current from the start to release of a short circuit. Further, the AC pulse control unit 111 controls the welding power source 20 to output predetermined transition currents A3 and A13 until a predetermined transition period P40 elapses after the release of the short circuit. The transition currents A3 and A13 are set so as not to promote the melting of the welding wire 16 between the base currents A2 and A12 and the peak currents A1 and A11. Further, the transition period P40 is set shorter than the remaining period of the base period P30 after the release of the short circuit. After the transition period P40, the AC pulse control unit 111 controls the welding power source 20 to output the base currents A2 and A12 again.

In some examples, such as where the workpiece W is set to the negative electrode during base period P30 after negative electrode peak period P20, the transition of a melted portion from the welding wire 16 to the workpiece W occurs with relatively high probability even if the welding wire 16 is not brought close to the workpiece W. Therefore, the welding wire 16 and the workpiece W may not be temporarily short circuited during the base period P30 after the negative electrode peak period P20.

Figure 5:
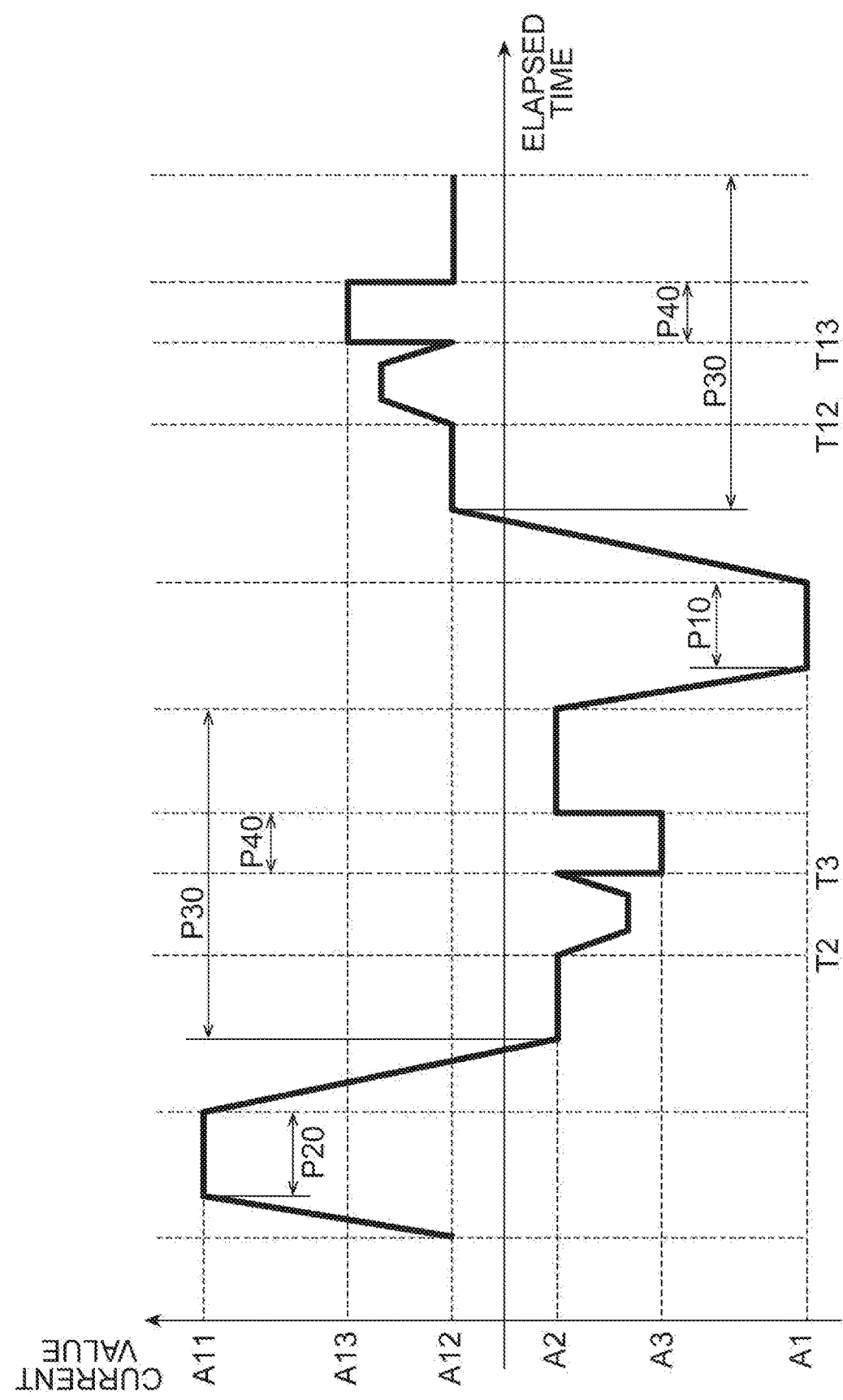
FIG. 5 is a graph showing another example of current control.
Figure 6:
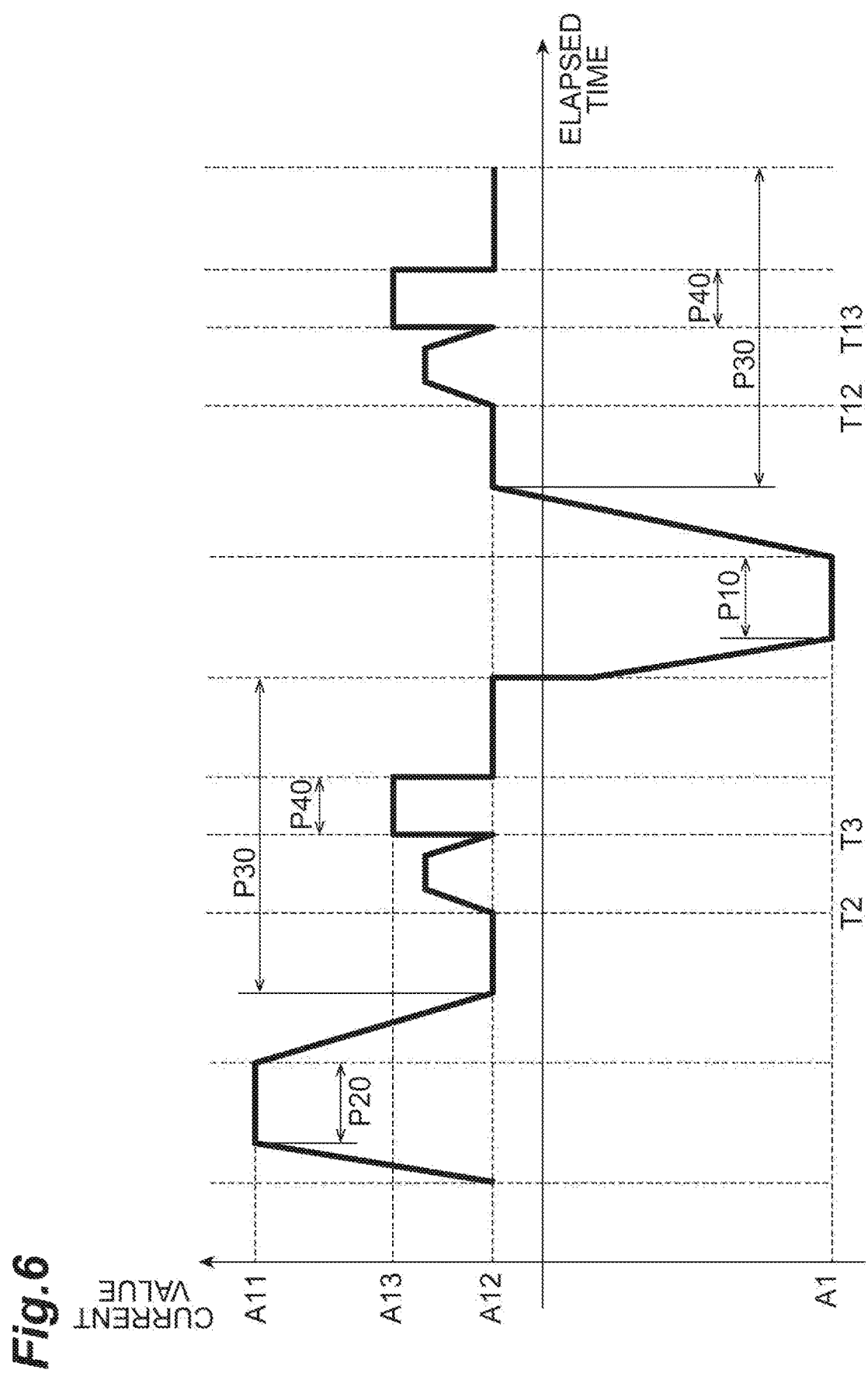
FIG. 6 is a graph showing another example of the current control.
Figure 7:
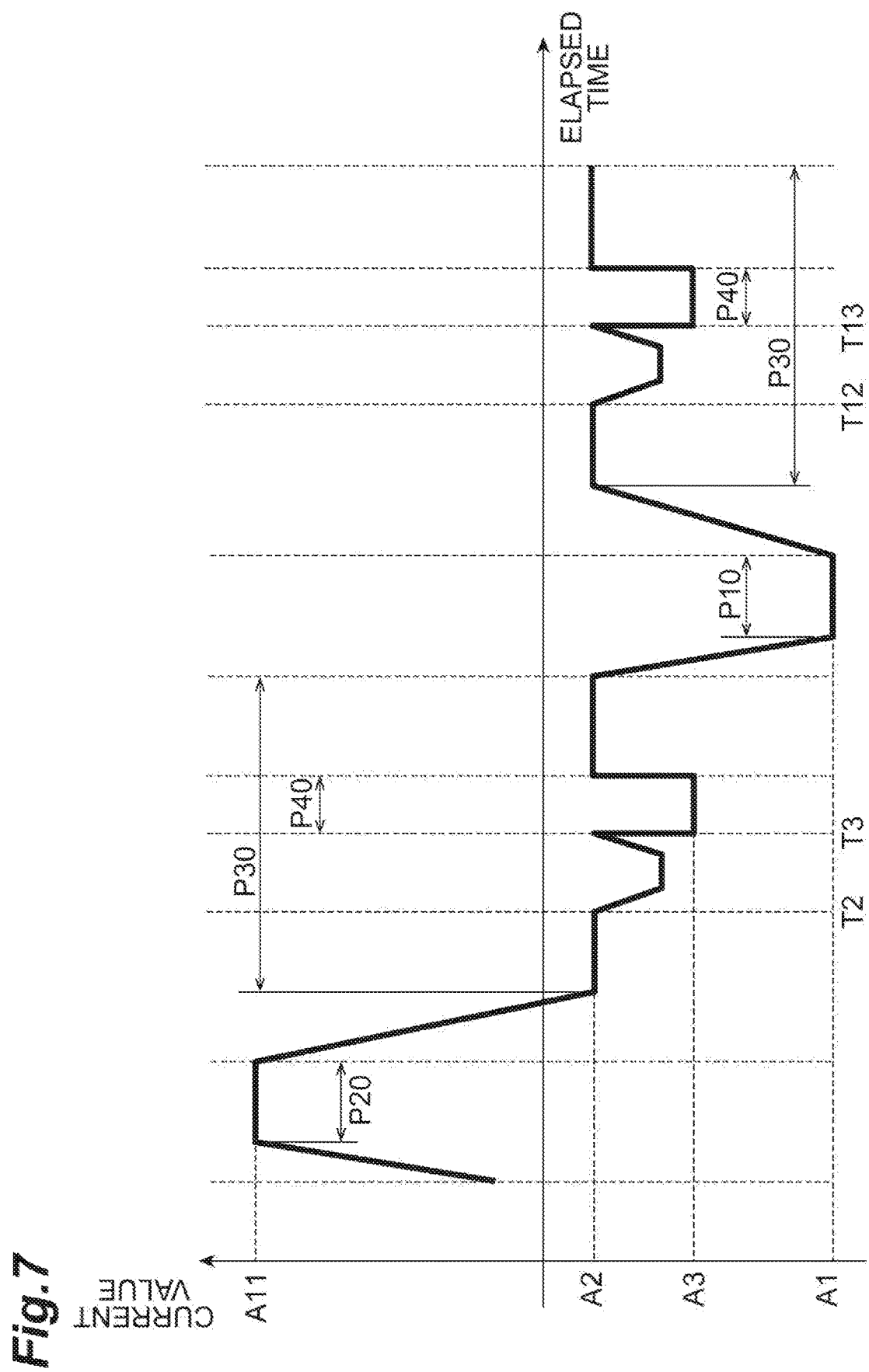
FIG. 7 is a graph showing another example of the current control.

If the welding wire 16 and the workpiece W are temporarily short-circuited during each of the base period P30 after the positive electrode peak period P10 and the base period P30 after the negative electrode peak period P20, the melted portion of the welding wire 16 is transferred to the workpiece W without depending on polarity. Therefore, the polarity during the base period P30 can be changed in a number of different ways. For example, the AC pulse control unit 111 may use the workpiece W as the negative electrode during the base period P30 after the positive electrode peak period P10 and use the workpiece W as the positive electrode during the base period P30 after the negative electrode peak period P20, while differentiating a polarity during the base period P30 after the positive electrode peak period P10 and a polarity during the base period P30 after the negative electrode peak period P20 (see FIG. 5). Further, the AC pulse control unit 111 may use the workpiece W as the negative electrode during each of the base period P30 after the positive electrode peak period P10 and the base period P30 after the negative electrode peak period P20 (see FIG. 6). Further, the AC pulse control unit 111 may use the workpiece W as the positive electrode during each of the base period P30 after the positive electrode peak period P10 and the base period P30 after the negative electrode peak period P20 (see FIG. 7). In some examples, the circuitry is further configured to control the welding power source so that a polarity during the first base period and a polarity during the second base period are different. In some examples, the circuitry is further configured to control the welding power source so that the first base current is output from the workpiece to the consumable electrode during the first base period, and so that the second base current is output from the consumable electrode to the workpiece during the second base period. In some examples, the circuitry is further configured to control the welding power source so that the first base current is output from the consumable electrode to the workpiece during the first base period, and so that the second base current is output from the consumable electrode to the workpiece during the second base period. In some examples, the circuitry is further configured to control the welding power source so that the first base current is output from the workpiece to the consumable electrode during the first base period, and so that the second base current is output from the workpiece to the consumable electrode during the second base period.

The welding controller 100 may further include a target heat input setting unit 116 and a frequency setting unit 117. The target heat input setting unit 116 calculates a target heat input based on at least one of a target bead width, a target penetration depth, a workpiece thickness, a target current, a target voltage, and a target feeding speed. The heat input is an average amount of heat provided to a welded portion per unit time. For example, the target heat input setting unit 116 increases a target heat input as a target bead width, a target penetration depth, or a thickness of a workpiece increases.

The frequency setting unit 117 sets a positive electrode frequency for repeating the positive electrode peak period with the positive electrode base period interposed and a negative electrode frequency for repeating the negative electrode peak period with the negative electrode base period interposed based on the target heat input. For example, the frequency setting unit 117 sets the positive electrode frequency and the negative electrode frequency so that a ratio of the negative electrode period to the positive electrode period increases as the target heat input increases.

Figure 8:
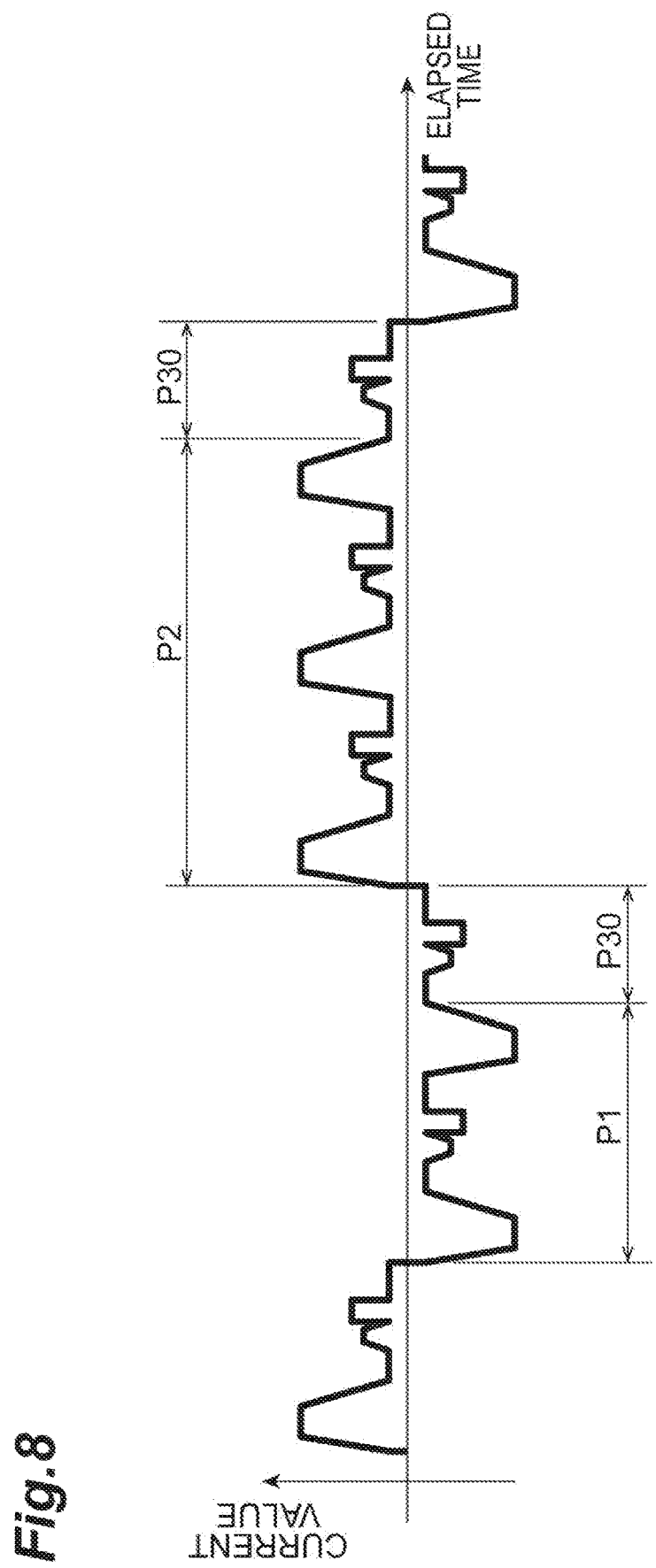
FIG. 8 is a graph showing another example of the current control.

In a case where the welding controller 100 has the target heat input setting unit 116 and the frequency setting unit 117, the AC pulse control unit 111 may control the welding power source 20 to alternately repeat, with the base period P30 interposed, a positive electrode period P1 in which the positive electrode peak period P10 of the positive electrode frequency is repeated with the base period P30 interposed and a negative electrode period P2 in which the negative electrode peak period P20 of the negative electrode frequency is repeated with the base period P30 interposed, as illustrated in FIG. 8.

Hardware Configuration of Controller

Figure 9:
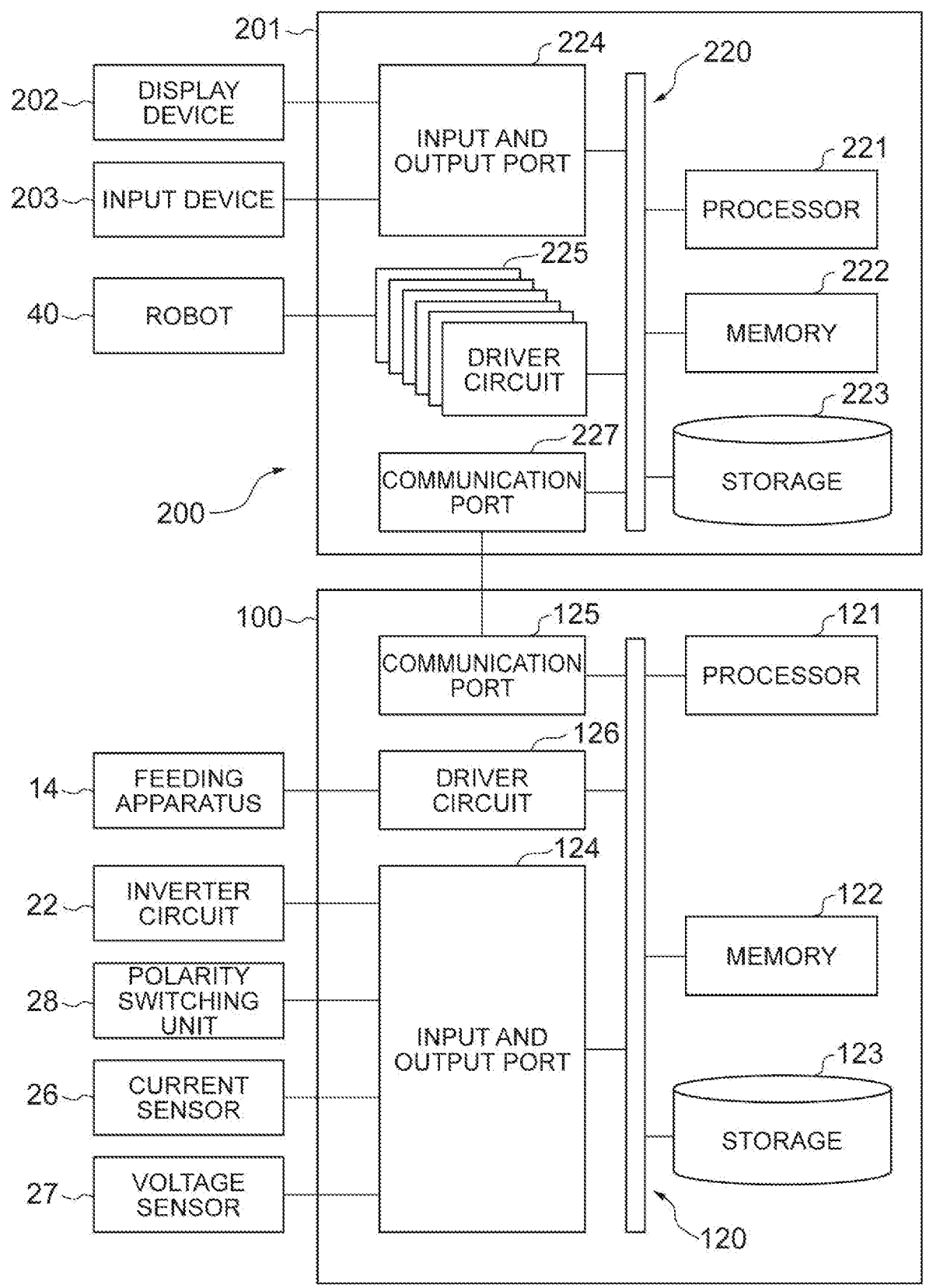
FIG. 9 is a block diagram illustrating an example hardware configuration of a robot controller and a welding controller.

FIG. 9 is a block diagram illustrating an example hardware configuration of the robot controller and the welding controller. The welding controller 100 includes circuitry 120. The circuitry 120 includes at least one processor 121, a memory 122, a storage 123, an input and output port 124, a driver circuit 126, and a communication port 125. The storage 123 is a non-volatile or non-transitive storage medium (for example, a flash memory) readable by a computer. For example, the storage 123 stores a program for causing the welding controller 100 to execute control of the welding power source 20 to alternately repeat a positive electrode peak period for outputting a peak current with the workpiece W as a positive electrode and a negative electrode peak period for outputting a peak current with the workpiece W as a negative electrode with a base period for outputting a base current interposed therebetween, and causing the feeding apparatus 14 to bring the welding wire 16 close to the workpiece W so as to temporarily short circuit the welding wire 16 and the workpiece W at least during the base period after the positive electrode peak period. As an example, the storage 123 stores a program for configuring a variety of the functional modules described above in the welding controller 100.

The memory 122 temporarily stores a program loaded from the storage 123, a calculation result by the processor 121, and the like. The processor 121 configures each functional module of the welding controller 100 by executing the program in cooperation with the memory 122. The driver circuit 126 drives an actuator of the feeding apparatus 14 in accordance with a command from the processor 121. The input and output port 124 inputs and outputs an electrical signal between the inverter circuit 22, the current sensor 26, the voltage sensor 27, and the polarity switching unit 28 in response to a command from the processor 121. The communication port 125 performs network communication with the robot controller 200 in response to a command from the processor 121. For example, the communication port 125 is used for acquisition of a welding command by the welding command acquisition unit 112.

The robot controller 200 includes a controller main body 201, a display device 202, and an input device 203. The display device 202 includes, for example, a liquid crystal monitor, and is used to display information to the user. The input device 203 is, for example, a foot switch or a keyboard, and acquires information input by the user. The display device 202 and the input device 203 may be integrated as what is called a touch panel. The display device 202 and the input device 203 are used for input of operation to the robot 40. The display device 202 and the input device 203 are also used by the user to input welding conditions.

The controller main body 201 includes circuitry 220. The circuitry 220 includes at least one processor 221, a memory 222, a storage 223, an input and output port 224, a plurality of driver circuits 225, and a communication port 227. The storage 223 is a non-volatile or non-transitive storage medium (for example, a flash memory) readable by a computer. For example, the storage 223 stores a program for causing the robot controller 200 to execute control of the robot 40.

A plurality of the driver circuits 225 drive the actuators 71, 72, 73, 74, 75, and 76 of the robot 40 in accordance with a command from the processor 221. The input and output port 224 inputs and outputs an electrical signal between the display device 202 and the input device 203 in response to a command from the processor 221. The communication port 227 performs network communication with the welding controller 100 in response to a command from the processor 221.

Welding Method

Next, an example welding procedure executed by the welding system 1 is described as an example of a welding method. The welding procedure includes output of current from the welding power source 20 between the welding wire 16 and the workpiece W, sending of the welding wire 16 to the workpiece W side by the feeding apparatus 14, control of the welding power source 20 to alternately repeat the positive electrode peak period and the negative electrode peak period with the base period interposed therebetween, and causing the feeding apparatus 14 to bring the welding wire 16 close to the workpiece W so as to temporarily short circuit the welding wire 16 and the workpiece W at least during the base period after the positive electrode peak period. Hereinafter, the example welding procedure is described by dividing the procedure into a setting procedure of detailed conditions of welding, a control procedure of the feeding apparatus, and a control procedure of the welding power source.

Setting Procedure of Detailed Conditions of Welding

Figure 10:
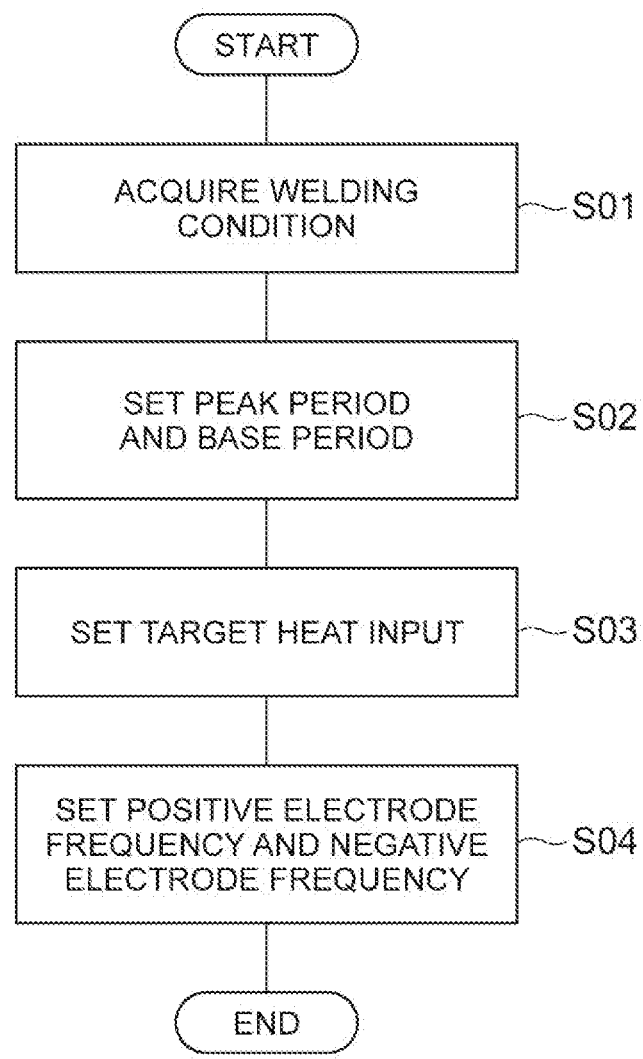
FIG. 10 is a flowchart illustrating an example setting procedure of detailed conditions of welding.

As illustrated in FIG. 10, the welding controller 100 executes Operations S01 and S02. In Operation S01, the welding command acquisition unit 112 acquires the welding conditions from robot controller 200. In Operation S02, the period setting unit 113 sets lengths of the positive electrode peak period P10, the negative electrode peak period P20, and the base period P30 based on the target current.

In Operation S03, the target heat input setting unit 116 calculates a target heat input based on at least one of a target bead width, a target penetration depth, a workpiece thickness, a target current, a target voltage, and a target feeding speed. For example, the target heat input setting unit 116 increases a target heat input as a target bead width, a target penetration depth, or a thickness of a workpiece increases. In Operation S04, the frequency setting unit 117 sets the positive electrode frequency for repeating the positive electrode peak period with the positive electrode base period interposed and the negative electrode frequency for repeating the negative electrode peak period with the negative electrode base period interposed based on the target heat input. The setting procedure of the detailed conditions of welding is completed as described above. Note that the execution order of Operations SO2 to S04 can be changed as appropriate. The welding controller 100 may execute, for example, Operation S02 after Operations S03 and SO4.

(Control Procedure of Feeding Apparatus)

Figure 11:
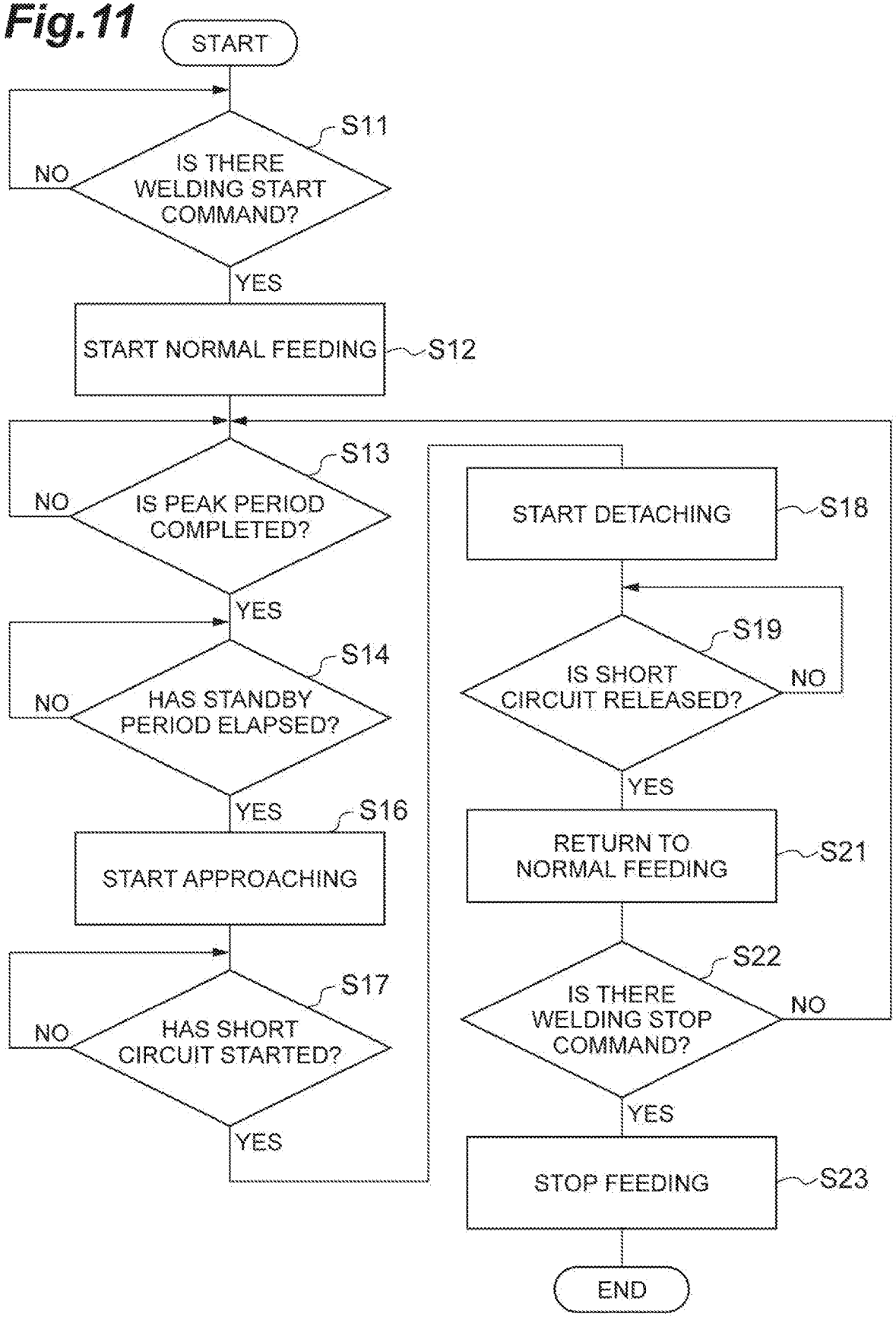
FIG. 11 is a flowchart illustrating an example control procedure of a feeding apparatus.

As illustrated in FIG. 11, the welding controller 100 executes Operations S11, S12, and S13. In Operation S11, the welding command acquisition unit 112 waits for acquisition of a welding start command from the robot controller 200. In Operation S12, the feed control unit 115 controls the feeding apparatus 14 to start normal feed of sending the welding wire 16 to the workpiece W at a speed that follows the target feeding speed. In Operation S13, the feed control unit 115 waits for the completion of the peak period (the positive electrode peak period P10 or the negative electrode peak period P20).

Additionally, the welding controller 100 executes Operations S14, S16, and S17. In Operation S14, the feed control unit 115 waits for the elapsed time from the completion of the peak period to reach the standby period P50. In Operation S16, the feed control unit 115 sets the feeding speed of the welding wire 16 by the feeding apparatus 14 to be larger than the target feeding speed v1 and starts the approach of the welding wire 16 to the workpiece W. In Operation S17, the feed control unit 115 waits for the short circuit detection unit 114 to detect the start of a short circuit.

Additionally, the welding controller 100 executes Operations S18, S19, S21, and S22. In Operation S18, the feed control unit 115 sets the feeding speed of the welding wire 16 by the feeding apparatus 14 to be smaller than the target feeding speed v1, and starts the detachment of the welding wire 16 from the workpiece W. In Operation S19, the feed control unit 115 waits for the short circuit detection unit 114 to detect the release of the short circuit. In Operation S21, the feed control unit 115 sets the feeding speed of the welding wire 16 by the feeding apparatus 14 to be larger than the target feeding speed v1, and returns the feeding speed of the welding wire 16 to the target feeding speed v1 after the welding wire 16 is brought close to the workpiece W again. In Operation S22, the welding command acquisition unit 112 checks for the existence or non-existence of a welding stop command from the robot controller 200.

In a case where it is determined that no welding stop command exists in Operation S22, the welding controller 100 returns the process to Operation S13. Until the welding stop command is acquired from the robot controller 200, a temporary short circuit is repeatedly generated during the base period P30 while the normal feeding is performed.

In a case where it is determined in Operation S22 that there is the welding stop command, the welding controller 100 executes Operation S23. In Operation S23, the feed control unit 115 controls the feeding apparatus 14 to stop the feeding of the welding wire 16. The control procedure of the feeding apparatus 14 is completed as described above.

(Control Procedure of Welding Power Source)

Figure 12:
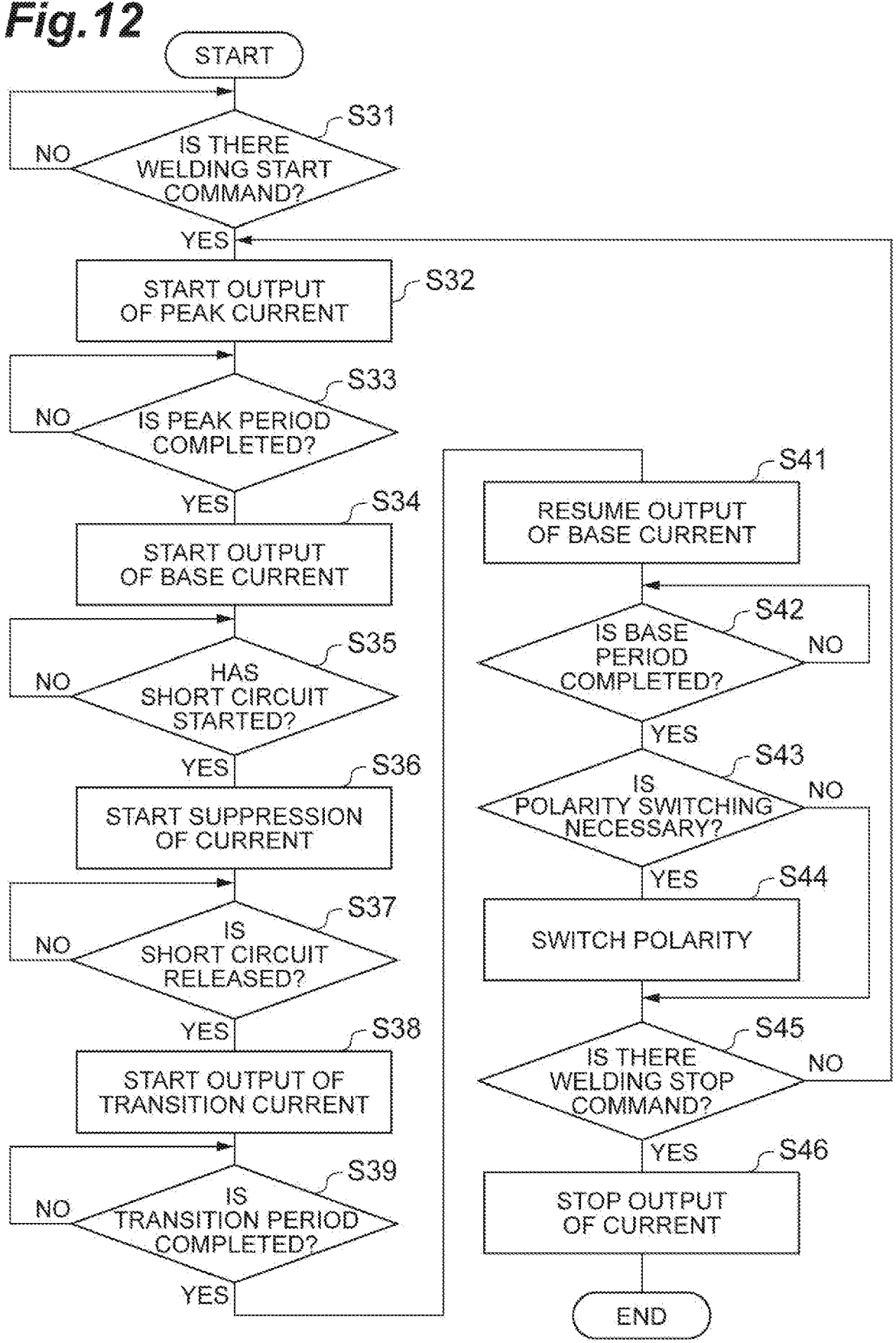
FIG. 12 is a flowchart illustrating an example control procedure of a welding power source.

As illustrated in FIG. 12, the welding controller 100 first executes Operations S31, S32, and S33. In Operation S31, the welding command acquisition unit 112 waits for acquisition of a welding start command from robot controller 200. In Operation S32, the AC pulse control unit 111 controls the welding power source 20 so as to start output of the peak currents A1 and A11 with the workpiece W used as a positive electrode or a negative electrode. In Operation S33, the AC pulse control unit 111 waits for the peak period (the positive electrode peak period P10 or the negative electrode peak period P20) to elapse.

Additionally, the welding controller 100 executes Operations S34, S35, S36, and S37. In Operation S34, the AC pulse control unit 111 controls the welding power source 20 so as to start output of the base currents A2 and A12 with the same polarity as that of a peak period immediately before. In Operation S35, the AC pulse control unit 111 waits for the short circuit detection unit 114 to detect the start of a short circuit. In Operation S36, the AC pulse control unit 111 starts control of the welding power source 20 so as to suppress an increase in current. In Operation S37, the AC pulse control unit 111 waits for the short circuit detection unit 114 to detect the release of the short circuit.

Additionally, the welding controller 100 executes Operations S38, S39, S41, and S42. In Operation S38, the AC pulse control unit 111 controls the welding power source 20 so as to start output of the transition current without changing the polarity. In Operation S39, the AC pulse control unit 111 waits for the transition period P40 to elapse. In Operation S41, the AC pulse control unit 111 controls the welding power source 20 so as to resume the output of the base current without changing the polarity. In Operation S42, the AC pulse control unit 111 waits for the base period P30 to elapse from the start of output of the base current in Operation S34.

Additionally, the welding controller 100 executes Operation S43. In Operation S43, the AC pulse control unit 111 determines whether to switch the polarity. In a case where the polarity of a next peak period is different from the polarity of a peak period immediately before, the AC pulse control unit 111 determines to switch the polarity. In a case where the polarity of the next peak period is the same as the polarity of the peak period immediately before, the AC pulse control unit 111 determines not to switch the polarity.

In a case where it is determined in Operation S43 to switch the polarity, the welding controller 100 executes Operation S44. In Operation S44, the AC pulse control unit 111 switches the polarity of the workpiece W. In some examples, the AC pulse control unit 111 reverses the polarity of the workpiece W and the welding wire 16.

Additionally, the welding controller 100 executes Operation S45. In a case where it is determined in Operation S43 not to switch the polarity, the welding controller 100 executes Operation S45 without executing Operation S44. In Operation S45, the welding command acquisition unit 112 checks existence or non-existence of a welding stop command from the robot controller 200.

In a case where it is determined that no welding stop command exists in Operation S45, the welding controller 100 returns the processing to Operation S32. Afterwards, until the welding stop command is acquired from the robot controller 200, the output of the peak current and the base current is repeated while switching of the polarity is performed.

In a case where it is determined in Operation S45 that there is the welding stop command, the welding controller 100 executes Operation S46. In Operation S46, the AC pulse control unit 111 controls the welding power source 20 so as to stop the output of the peak current and the base current. The control procedure of the welding power source 20 is completed as described above.

As described above, the welding apparatus 10 includes the welding power source 20 for outputting current between the consumable electrode and the workpiece W, the feeding apparatus 14 for sending the consumable electrode to the workpiece W, the AC pulse control unit 111, and the feed control unit 115. The AC pulse control unit 111 may be configured to control the welding power source 20 to alternately repeat the positive electrode peak period P10 for outputting the peak current A1 with the workpiece W as a positive electrode and the negative electrode peak period P20 for outputting the peak current A11 with the workpiece W as a negative electrode with the base period P30 for outputting the base currents A2 and A12. Additionally, the feed control unit 115 may be configured to cause the feeding apparatus 14 to bring the consumable electrode close to the workpiece W so as to temporarily short circuit the consumable electrode and the workpiece W at least during the base period P30 after the positive electrode peak period P10.

In the welding in which the positive electrode peak period P10 and the negative electrode peak period P20 are alternately repeated with the base period P30 interposed therebetween, droplets formed on the consumable electrode in the positive electrode peak period P10 may remain on the consumable electrode until the negative electrode peak period P20. If the droplets formed on the consumable electrode during the positive electrode peak period P10 are scattered in a transition process to the negative electrode peak period P20, the welding quality may be degraded. In contrast, during the base period P30 after the positive electrode peak period P10, the feeding apparatus 14 is controlled so as to temporarily short circuit the consumable electrode and the workpiece W. Therefore, most of the droplets formed on the consumable electrode during the positive electrode peak period P10 are transferred to the workpiece W before the transition to the negative electrode peak period P20. This makes scattering of the droplets less likely to occur which is effective in the improvement of welding quality.

Also during the base period P30 after the negative electrode peak period P20, the feed control unit 115 may cause the feeding apparatus 14 to bring the consumable electrode close to the workpiece W so as to temporarily short circuit the consumable electrode and the workpiece W. In some examples, also during the base period P30 after the negative electrode peak period P20, the droplets on the consumable electrode are more reliably transferred to the workpiece W. This makes scattering of the droplets further less likely to occur to further improve welding quality.

The AC pulse control unit 111 may control the welding power source 20 so that the polarity during the base period P30 after the positive electrode peak period P10 becomes different from the polarity during the base period P30 after the negative electrode peak period P20. Even in a case where any of the peak currents A1 and A11 and the base currents A2 and A12 is output, the heat input to the workpiece W tends to be smaller when the workpiece W is a positive electrode than when the workpiece W is a negative electrode. By making the polarity during the base period after the positive electrode peak period P10 different from the polarity during the base period after the negative electrode peak period P20, an excess or deficiency of the heat input during the base period P30 may be suppressed.

The AC pulse control unit 111 may control the welding power source 20 to use the workpiece W as the positive electrode during the base period P30 after the positive electrode peak period P10, and use the workpiece W as the negative electrode during the base period P30 after the negative electrode peak period P20. In some examples, a current fluctuation is suppressed to be relatively small either after the end of the positive electrode peak period P10 or after the end of the negative electrode peak period P20 in order to suppress the scattering of the droplets caused by a current fluctuation after the peak period.

The AC pulse control unit 111 may use the workpiece W as the negative electrode during each of the base period P30 after the positive electrode peak period P10 and the base period P30 after the negative electrode peak period P20. The transfer of droplets during the base period P30 tends to be smooth in a case where the workpiece W side is a negative electrode, as compared with the case where the workpiece W side is a positive electrode. Therefore, during each of the base period P30 after the positive electrode peak period P10 and the base period P30 after the negative electrode peak period P20, scattering of droplets at the time of transfer to the workpiece W side can be suppressed by using the workpiece W side as the negative electrode.

The AC pulse control unit 111 may use the workpiece W as the positive electrode during each of the base period P30 after the positive electrode peak period P10 and the base period P30 after the negative electrode peak period P20. Suppressing the heat input to the workpiece W during each of the base period P30 after the positive electrode peak period P10 and the base period P30 after the negative electrode peak period P20 may be an effective technique when the application is expanded to the workpiece W that is extremely thin.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

What is claimed is:

1. A welding apparatus comprising:
   a welding power source configured to output current between a consumable electrode and a workpiece;
   a feeding apparatus configured to move the consumable electrode toward the workpiece; and
   at least one processor configured to:
      control the welding power source to repeat a sequence including:
         outputting a positive peak current from the workpiece to the consumable electrode during a positive peak period;
         outputting a first base current between the consumable electrode and the workpiece during a first base period following the positive peak period, an absolute value of the first base current being less than the positive peak current; and
         outputting a negative peak current from the consumable electrode to the workpiece during a negative peak period following the first base period, an absolute value of the negative peak current being greater than the absolute value of the first base current;
      control the feeding apparatus to feed the consumable electrode to the workpiece at a feeding speed in accordance with a target feeding speed to keep a distance between the consumable electrode and the workpiece; and
      control the feeding apparatus to temporarily set the feeding speed higher than the target feeding speed to bring the consumable electrode close to the workpiece so as to temporarily short circuit the consumable electrode and the workpiece during the first base period.

2. The welding apparatus according to claim 1, wherein the processor is configured to:
   control the welding power source to repeat the sequence further including outputting a second base current between the consumable electrode and the workpiece during a second base period following the negative peak period, an absolute value of the second base current being less than an absolute value of the negative peak current; and
   control the feeding apparatus to move the consumable electrode close to the workpiece so as to temporarily short circuit the consumable electrode and the workpiece during the second base period.

3. The welding apparatus according to claim 2, wherein the processor is further configured to control the welding power source so that a polarity during the first base period and a polarity during the second base period are different.

4. The welding apparatus according to claim 3, wherein the processor is further configured to control the welding power source so that the first base current is output from the workpiece to the consumable electrode during the first base period, and so that the second base current is output from the consumable electrode to the workpiece during the second base period.

5. The welding apparatus according to claim 1, wherein the processor is further configured to control the welding power source to output a first transition current following the short circuit between the consumable electrode and the workpiece during the first base period, an absolute value of the first transition current being greater than the absolute value of the first base current and less than the positive peak current.

6. The welding apparatus according to claim 5, wherein the processor is further configured to control the welding power source to output the first base current before and after outputting the first transition current during the first base period.

7. The welding apparatus according to claim 2, wherein the processor is further configured to:
   control the welding power source to output a first transition current following the short circuit between the consumable electrode and the workpiece during the first base period, an absolute value of the first transition current being greater than the absolute value of the first base current and less than the positive peak current; and
   control the welding power source to output a second transition current following the short circuit between the consumable electrode and the workpiece during the second base period, an absolute value of the second transition current being greater than the absolute value of the second base current and less than the absolute value of the negative peak current.

8. A welding method comprising:
   outputting current from a welding power source between a consumable electrode and a workpiece;
   moving the consumable electrode toward the workpiece by a feeding apparatus;
   controlling the welding power source to repeat a sequence including:
      outputting a positive peak current from the workpiece to the consumable electrode during a positive peak period;
      outputting a first base current between the consumable electrode and the workpiece during a first base period following the positive peak period, an absolute value of the first base current being less than the positive peak current; and
      outputting a negative peak current from the consumable electrode to the workpiece during a negative peak period following the first base period, an absolute value of the negative peak current being greater than the absolute value of the first base current;
   controlling the feeding apparatus to feed the consumable electrode to the workpiece at a feeding speed in accordance with a target feeding speed to keep a distance between the consumable electrode and the workpiece; and
   controlling the feeding apparatus to temporarily set the feeding speed higher than the target feeding speed to bring the consumable electrode close to the workpiece so as to temporarily short circuit the consumable electrode and the workpiece during the first base period.

9. The welding method according to claim 8, further comprising:
   controlling the welding power source to repeat the sequence further including outputting a second base current between the consumable electrode and the workpiece during a second base period following the negative peak period, an absolute value of the second base current being less than an absolute value of the negative peak current; and
   controlling the feeding apparatus to move the consumable electrode close to the workpiece so as to temporarily short circuit the consumable electrode and the workpiece during the second base period.

10. The welding method according to claim 9, further comprising controlling the welding power source so that a polarity during the first base period and a polarity during the second base period are different.

11. The welding method according to claim 10, further comprising controlling the welding power source so that the first base current is output from the workpiece to the consumable electrode during the first base period, and so that the second base current is output from the consumable electrode to the workpiece during the second base period.

12. The welding method according to claim 9, further comprising controlling the welding power source so that the first base current is output from the consumable electrode to the workpiece during the first base period, and so that the second base current is output from the consumable electrode to the workpiece during the second base period.

13. The welding method according to claim 9, further comprising controlling the welding power source so that the first base current is output from the workpiece to the consumable electrode during the first base period, and so that the second base current is output from the workpiece to the consumable electrode during the second base period.

14. The welding method according to claim 8, further comprising controlling the welding power source to output a first transition current following the short circuit between the consumable electrode and the workpiece during the first base period, an absolute value of the first transition current being greater than the absolute value of the first base current and less than the positive peak current.

15. The welding method according to claim 14, further comprising controlling the welding power source to output the first base current before and after outputting the first transition current during the first base period.

16. The welding method according to claim 9, further comprising:
controlling the welding power source to output a first transition current following the short circuit between the consumable electrode and the workpiece during the first base period, an absolute value of the first transition current being greater than the absolute value of the first base current and less than the positive peak current; and
controlling the welding power source to output a second transition current following the short circuit between the consumable electrode and the workpiece during the second base period, an absolute value of the second transition current being greater than the absolute value of the second base current and less than the absolute value of the negative peak current.

17. A non-transitory memory device having instructions stored thereon that, in response to execution by a processing device, cause the processing device to perform operations comprising:
outputting current from a welding power source between a consumable electrode and a workpiece;
moving the consumable electrode toward the workpiece by a feeding apparatus;
controlling the welding power source to repeat a sequence including:
outputting a positive peak current from the workpiece to the consumable electrode during a positive peak period;
outputting a first base current between the consumable electrode and the workpiece during a first base period following the positive peak period, an absolute value of the first base current being less than the positive peak current; and
outputting a negative peak current from the consumable electrode to the workpiece during a negative peak period following the first base period, an absolute value of the negative peak current being greater than the absolute value of the first base current;
controlling the feeding apparatus to feed the consumable electrode to the workpiece at a feeding speed in accordance with a target feeding speed to keep a distance between the consumable electrode and the workpiece; and
controlling the feeding apparatus to temporarily set the feeding speed higher than the target feeding speed to bring the consumable electrode close to the workpiece so as to temporarily short circuit the consumable electrode and the workpiece during the first base period.

18. The welding apparatus according to claim 1, wherein the processor is further configured to control the feeding apparatus to temporarily set the feeding speed lower than the target feeding speed after the short circuit between the consumable electrode and the workpiece to detach the consumable electrode from the workpiece during the first base period.

19. The welding method according to claim 8 further comprising controlling the feeding apparatus to temporarily set the feeding speed lower than the target feeding speed after the short circuit between the consumable electrode and the workpiece to detach the consumable electrode from the workpiece during the first base period.

20. The non-transitory memory device according to claim 17, wherein the operations further comprise controlling the feeding apparatus to temporarily set the feeding speed lower than the target feeding speed after the short circuit between the consumable electrode and the workpiece to detach the consumable electrode from the workpiece during the first base period.

* * * * *